US012675767B2

(12) United States Patent
Cooper et al.

(10) Patent No.: US 12,675,767 B2
(45) Date of Patent: Jul. 7, 2026

(54) METHOD AND SYSTEM FOR MATERIAL REPLENISHMENT PLANNING

(71) Applicant: Tata Consultancy Services Limited, Mumbai (IN)

(72) Inventors: Kyle Stephen Cooper, Cincinnati, OH (US); Devadatta Madhukar Kulkarni, Rochester Hills, MI (US); Jeffrey David Tew, Rochester Hills, MI (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 461 days.

(21) Appl. No.: 18/133,266

(22) Filed: Apr. 11, 2023

(65) Prior Publication Data

US 2023/0334416 A1 Oct. 19, 2023

(30) Foreign Application Priority Data

Apr. 13, 2022 (IN) .............................. 202221022183

(51) Int. Cl.
*G06Q 10/087* (2023.01)
*G06N 20/00* (2019.01)

(52) U.S. Cl.
CPC ........... *G06Q 10/087* (2013.01); *G06N 20/00* (2019.01)

(58) Field of Classification Search
CPC ...... G06Q 10/087; G06Q 10/08; G06Q 50/04; G06Q 10/04; G06N 20/00; G06N 3/08
See application file for complete search history.

(56) References Cited

U.S. PATENT DOCUMENTS

| | | | | |
|---|---|---|---|---|
| 6,885,902 | B2 * | 4/2005 | Crampton | .............. G06Q 10/06 700/32 |
| 7,120,596 | B2 * | 10/2006 | Hoffman | ................ G06Q 40/12 705/28 |
| 10,241,961 | B2 * | 3/2019 | Weyerhaeuser | .. G06F 16/24542 |
| 11,475,531 | B2 * | 10/2022 | Ganesan | .............. G06Q 10/087 |
| 11,886,779 | B2 * | 1/2024 | Mirabella | ................ G06N 5/04 |
| 2003/0055710 | A1 * | 3/2003 | Burk | .................... G06Q 20/382 705/64 |

(Continued)

OTHER PUBLICATIONS

JP-2004094900-A Miyashita Kazuo (translation) (Year: 2004).*

(Continued)

*Primary Examiner* — Michael Jared Walker
(74) *Attorney, Agent, or Firm* — Finnegan, Henderson, Farabow, Garrett & Dunner, LLP

(57) ABSTRACT
State of the art approaches being used for material replenishment planning have the disadvantage that they fall short in addressing the realities of evolving demand mixes and product utilization. The technologies leverage inflexible statistical models which are tightly coupled to specific industries, business processes, and deeper assumptions and therefore the model and any optimization produce results where the quality of results is heavily curtailed as real business processes deviate from the model assumptions and unforeseen scenarios arise the business and the broader ecosystem evolve. The method and system disclosed in the embodiments herein facilitate generating simulation of various material replenishment scenarios based on a user input. The method and system further generates one or more recommendations for material replenishment, based on an optimization process carried out.

18 Claims, 13 Drawing Sheets

(56)　　　　　　References Cited

U.S. PATENT DOCUMENTS

| | | | | |
|---|---|---|---|---|
| 2003/0069766 | A1* | 4/2003 | Hoffman | G06Q 10/063 |
| | | | | 705/7.29 |
| 2003/0078845 | A1* | 4/2003 | Hoffman | G06Q 10/06 |
| | | | | 705/22 |
| 2014/0052491 | A1* | 2/2014 | Narayanan | G06Q 10/087 |
| | | | | 705/7.25 |
| 2018/0330316 | A1* | 11/2018 | Rajkhowa | G06Q 10/087 |
| 2020/0128101 | A1* | 4/2020 | Meng | H04L 67/75 |
| 2020/0334619 | A1* | 10/2020 | Rorro | G06Q 30/0635 |
| 2020/0348659 | A1* | 11/2020 | Dong | G05B 19/406 |
| 2021/0232911 | A1* | 7/2021 | Velagapudi | G06N 3/08 |
| 2022/0027817 | A1* | 1/2022 | Hubbs | G06Q 10/0631 |
| 2023/0101023 | A1* | 3/2023 | Jin | G06Q 10/087 |
| | | | | 705/7.31 |
| 2023/0196278 | A1* | 6/2023 | Harsha | G06Q 10/087 |
| | | | | 705/7.31 |
| 2023/0306347 | A1* | 9/2023 | Evans | G06Q 10/06315 |
| 2024/0037111 | A1* | 2/2024 | Xu | G06F 16/24578 |

OTHER PUBLICATIONS

Ben-Ammar et al., "A hybrid genetic algorithm for a multilevel assembly replenishment planning problem with stochastic lead times," Computers & Industrial Engineering, 149 (2020).

Wang et al., "Dynamic inventory replenishment strategy for aerospace manufacturing supply chain: combining reinforcement learning and multi-agent simulation," International Journal of Production Research (2022).

\* cited by examiner

100

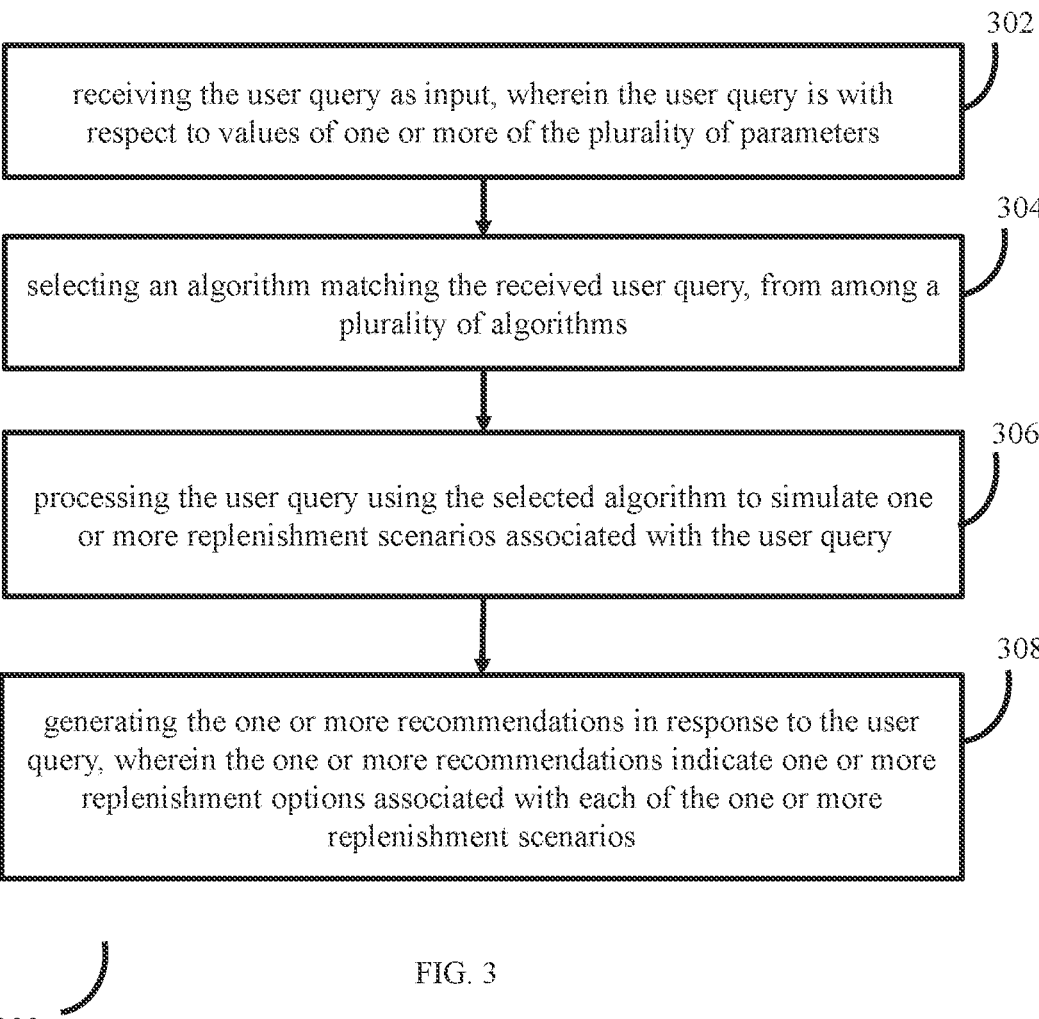

302 receiving the user query as input, wherein the user query is with respect to values of one or more of the plurality of parameters

304 selecting an algorithm matching the received user query, from among a plurality of algorithms

306 processing the user query using the selected algorithm to simulate one or more replenishment scenarios associated with the user query

308 generating the one or more recommendations in response to the user query, wherein the one or more recommendations indicate one or more replenishment options associated with each of the one or more replenishment scenarios

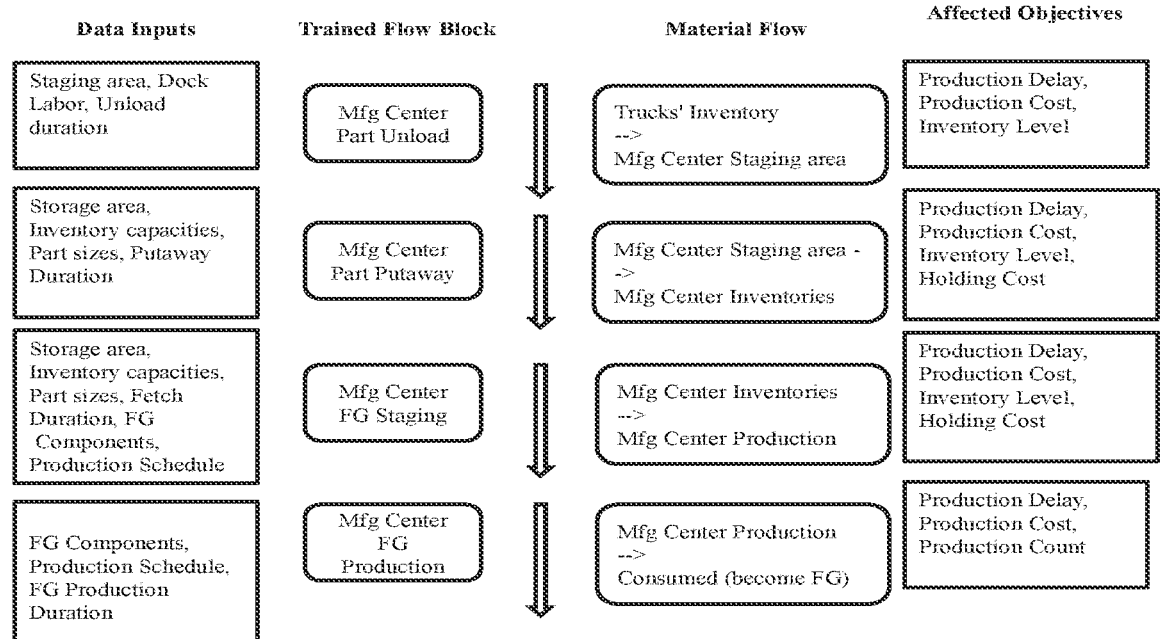

| Data Inputs | Trained Flow Block | Material Flow | Affected Objectives |
|---|---|---|---|
| Staging area, Dock Labor, Unload duration | Mfg Center Part Unload | Trucks' Inventory --> Mfg Center Staging area | Production Delay, Production Cost, Inventory Level |
| Storage area, Inventory capacities, Part sizes, Putaway Duration | Mfg Center Part Putaway | Mfg Center Staging area --> Mfg Center Inventories | Production Delay, Production Cost, Inventory Level, Holding Cost |
| Storage area, Inventory capacities, Part sizes, Fetch Duration, FG Components, Production Schedule | Mfg Center FG Staging | Mfg Center Inventories --> Mfg Center Production | Production Delay, Production Cost, Inventory Level, Holding Cost |
| FG Components, Production Schedule, FG Production Duration | Mfg Center FG Production | Mfg Center Production --> Consumed (become FG) | Production Delay, Production Cost, Production Count |

FIG. 4

Material Replenisher Optimizer (1 iteration of 1 instance)

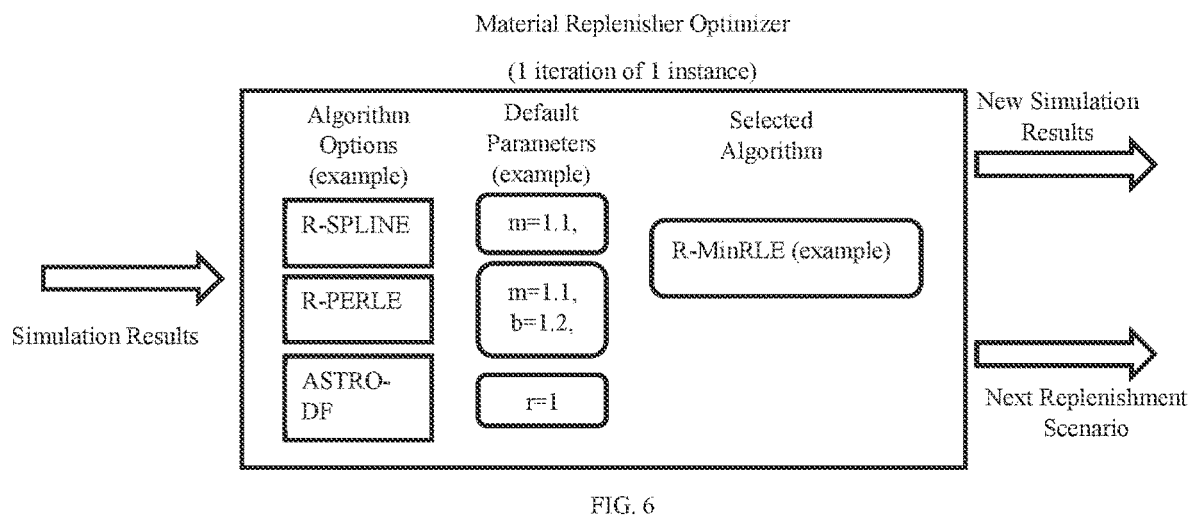

Algorithm Options (example)
- R-SPLINE
- R-PERLE
- ASTRO-DF

Default Parameters (example)
- m=1.1,
- m=1.1, b=1.2,
- r=1

Selected Algorithm
- R-MinRLE (example)

Simulation Results

New Simulation Results

Next Replenishment Scenario

FIG. 6

Block of blocks for MFG C
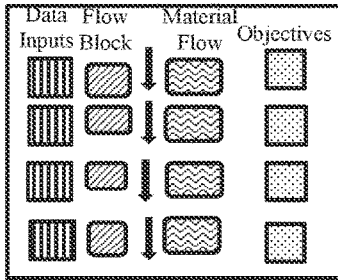
Block of blocks for SUPP A
Block of blocks for DC B
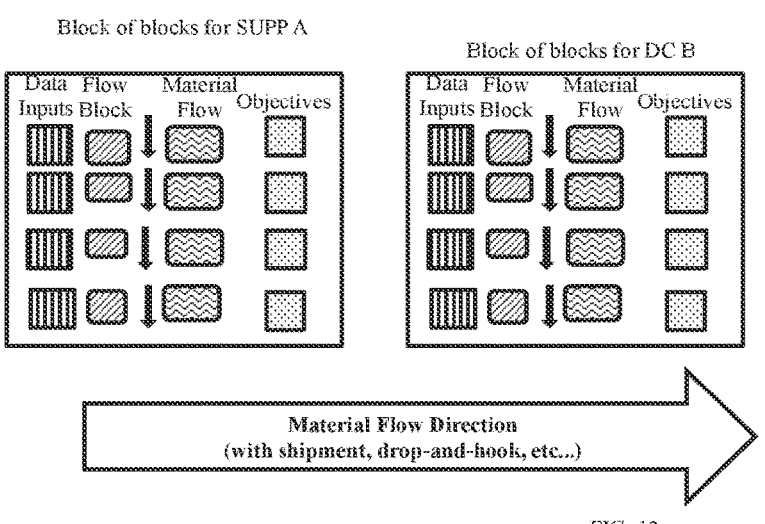
Block of blocks for SVC D
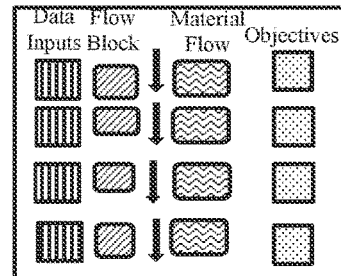
Material Flow Direction
(with shipment, drop-and-hook, etc...)
FIG. 13

METHOD AND SYSTEM FOR MATERIAL REPLENISHMENT PLANNING

PRIORITY CLAIM

This U.S. patent application claims priority under 35 U.S.C. § 119 to: Indian Provisional Patent Application No. 202221022183, filed on Apr. 13, 2022. The entire contents of the aforementioned application are incorporated herein by reference.

TECHNICAL FIELD

The disclosure herein generally relates to material replenishment, and, more particularly, to a method and system for material replenishment planning.

BACKGROUND

Product manufacturers face significant challenges in managing on-time delivery for their products and services due to availability issues of production and replacement parts. Availability issues arise due to missing delivery timings, missing replenishment orders, and being uncertain of supplier lead times. Products such as heavy machinery, automotive airplanes, and their engines are expensive and have long life cycles. Managing the availability of required parts for a mix of regularly scheduled maintenance and sudden emergency breakdowns, across the service locations around the globe with scheduled and emergency production, is a major challenge in minimizing delays and costs in customer or service orders. On-time production and service fulfillment has been a major driver for customer and revenue growth with the production and service-based customer contracts that have dominated markets for complex machinery, e.g. airplane engines.

Existing technologies drive production and service center network design by considering geography and products of future customers' demand mix. These technologies are driven by material replenishment plans using traditional statistical forecasting and occasionally optimization methods. However, the technologies fall short in addressing the realities of evolving demand mixes and product utilization. The technologies leverage inflexible statistical models which are tightly coupled to specific industries, business processes, and deeper assumptions and therefore the model and any optimization produce results where the quality of results is heavily curtailed as real business processes deviate from the model assumptions as unforeseen scenarios arise in the business and the broader ecosystem evolve. These curtailed results typically arise from models using averages of data meaning that the inherent variations in the business processes and the impacts of this variation in common business scenarios remain hidden to the process owners. Furthermore, when solutions offer optimization, it is for a specific, single objective analytically surmised from the model. The optimal results lose their robustness when a business process deviates from the model and business decisions require the consideration of multiple criteria or changes in inputs.

SUMMARY

Embodiments of the present disclosure present technological improvements as solutions to one or more of the above-mentioned technical problems recognized by the inventors in conventional systems. For example, in one embodiment, a processor implemented method is provided. In this method, initially an input data comprising a plurality of inventory policies is received via one or more hardware processors. Further, sufficiency of data for constructing a simulation network is verified, via the one or more hardware processors, by processing the input data. Further, a plurality of replenishment scenarios are simulated, via the one or more hardware processors, wherein each of the plurality of replenishment scenarios indicates a replenishment requirement associated with change in value of one or more of a plurality of parameters. Simulating each of the plurality of replenishment scenarios includes the following steps. In this process, at least one of a plurality of flow blocks associated with a plurality of scenarios supporting one or more contents of the input data is determined, wherein the plurality of flow blocks are updated if none of the plurality of flow blocks is supporting the one or more contents of the input data. Further, one or more simulation results are generated for the input data, based on a master data with respect to a plurality of parts and products, one or more material one or more flow facilities, one or more facility roles, one or more business policies, and a safety stock information, wherein, the one or more simulation results for the input data forms a training data.

In another embodiment, a deep learning data model is trained using the training data.

In yet another embodiment, the deep learning data model is used to generate one or more recommendations in response to a user query. Generating the one or more recommendations includes the following steps. Initially, the user query is received as input, wherein the user query is with respect to values of one or more of the plurality of parameters. Further, an algorithm matching the received user query is selected from among a plurality of algorithms. Further, the user query is processed using the selected algorithm to simulate one or more replenishment scenarios associated with the user query. Further, one or more recommendations are generated in response to the user query, wherein the one or more recommendations indicate one or more replenishment options associated with each of the one or more replenishment scenarios.

In yet another embodiment, a system is provided. The system includes one or more hardware processors, a communication interface, and a memory storing a plurality of instructions. The plurality of instructions when executed, cause the one or more hardware processors to receive an input data comprising a plurality of inventory policies. Further, sufficiency of data for constructing a simulation network is verified, via the one or more hardware processors, by processing the input data. Further, a plurality of replenishment scenarios are simulated, via the one or more hardware processors, wherein each of the plurality of replenishment scenarios indicates a replenishment requirement associated with change in value of one or more of a plurality of parameters. Simulating each of the plurality of replenishment scenarios includes the following steps. In this process, at least one of a plurality of flow blocks associated with a plurality of scenarios supporting one or more contents of the input data is determined, wherein the plurality of flow blocks are updated if none of the plurality of flow blocks is supporting the one or more contents of the input data. Further, one or more simulation results are generated for the input data, based on a master data with respect to a plurality of parts and products, one or more material one or more flow facilities, one or more facility roles, one or more business policies, and a safety stock information, wherein, the one or more simulation results for the input data forms a training data.

In yet another embodiment, the system trains a deep learning data model using the training data.

In yet another embodiment, the system uses the deep learning data model to generate one or more recommendations in response to a user query. Generating the one or more recommendations includes the following steps. Initially, the user query is received as input, wherein the user query is with respect to values of one or more of the plurality of parameters. Further, an algorithm matching the received user query is selected from among a plurality of algorithms. Further, the user query is processed using the selected algorithm to simulate one or more replenishment scenarios associated with the user query. Further, one or more recommendations are generated in response to the user query, wherein the one or more recommendations indicate one or more replenishment options associated with each of the one or more replenishment scenarios.

In yet another aspect, a non-transitory computer readable medium is provided. The non-transitory computer readable medium includes a plurality of instructions, which when executed, causes one or more hardware processors to initially receive an input data comprising a plurality of inventory policies. Further, sufficiency of data for constructing a simulation network is verified, via the one or more hardware processors, by processing the input data. Further, a plurality of replenishment scenarios are simulated, via the one or more hardware processors, wherein each of the plurality of replenishment scenarios indicates a replenishment requirement associated with change in value of one or more of a plurality of parameters. Simulating each of the plurality of replenishment scenarios includes the following steps. In this process, at least one of a plurality of flow blocks associated with a plurality of scenarios supporting one or more contents of the input data is determined, wherein the plurality of flow blocks are updated if none of the plurality of flow blocks is supporting the one or more contents of the input data. Further, one or more simulation results are generated for the input data, based on a master data with respect to a plurality of parts and products, one or more material one or more flow facilities, one or more facility roles, one or more business policies, and a safety stock information, wherein, the one or more simulation results for the input data forms a training data.

In yet another embodiment, the non-transitory computer readable medium causes training of a deep learning data model using the training data.

In yet another embodiment, the non-transitory computer readable medium causes use of the deep learning data model to generate one or more recommendations in response to a user query. Generating the one or more recommendations includes the following steps. Initially, the user query is received as input, wherein the user query is with respect to values of one or more of the plurality of parameters. Further, an algorithm matching the received user query is selected from among a plurality of algorithms. Further, the user query is processed using the selected algorithm to simulate one or more replenishment scenarios associated with the user query. Further, one or more recommendations are generated in response to the user query, wherein the one or more recommendations indicate one or more replenishment options associated with each of the one or more replenishment scenarios.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram depicting steps involved in the process of using a generated deep learning data model for performing the replenishment planning, by the system of FIG. 1, according to some embodiments of the present disclosure.

FIG. 4 illustrates example flow blocks of a manufacturing centre, which may be processed by the system of FIG. 1 for the material replenishment, in accordance with some embodiments of the present disclosure.

FIG. 6 illustrates an example of various inputs and outputs of a material replenisher optimizer of the system of FIG. 1 (alternately referred to as material replenisher planner) for the material replenishment, in accordance with some embodiments of the present disclosure.

FIG. 13 illustrates examples of flow blocks used by the system of FIG. 1, in accordance with some embodiments of the present disclosure.

DETAILED DESCRIPTION

Figure 1:
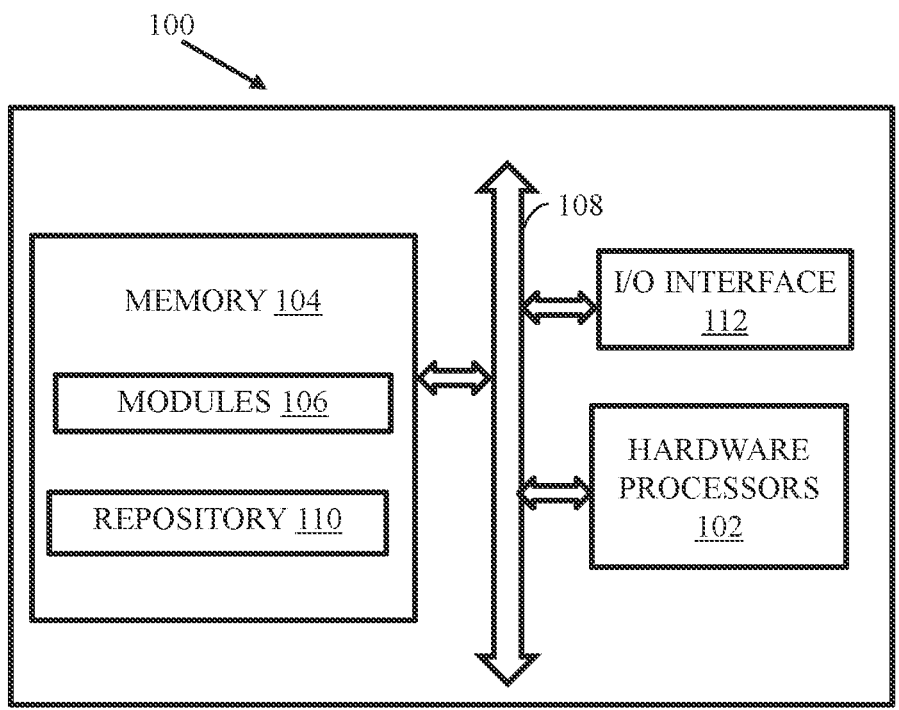
FIG. 1 illustrates block diagram of a system for material replenishment, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Existing technologies used for material replenishment planning fall short in addressing the realities of evolving demand mixes and product utilization. The technologies leverage inflexible statistical models which are tightly coupled to specific industries, business processes, and deeper assumptions and therefore the model and any optimization produce results where the quality of results is heavily curtailed as real business processes deviate from the model assumptions and unforeseen scenarios arise the business and the broader ecosystem evolve. The models typically operate using averages of data meaning that the inherent variations in the business processes and the impacts of this variation in common business scenarios remain hidden to the process owners. Furthermore, when solutions offer optimization, it is for a specific, single objective analytically surmised from the model. The optimal results lose their robustness when a business process deviates from the model and business decisions require the consideration of multiple criteria or changes in inputs.

In order to address these challenges, a method and system for material replenishment planning are provided. The method involves generating a training data by simulating a variety of material replenishment scenarios for a given set of input data, and then using the training data to generate a deep learning data model. The system then uses the generated deep learning data model to generate one or more recommendations in response to the user query, wherein the one or more recommendations indicate one or more replenishment options associated with each of the one or more replenishment scenarios.

The system disclosed in the embodiments herein enables simulation of a variety of scenarios, with changes to the key inputs, to present alternatives and further, to systematically drive suitable choices among the alternatives. The simulations enable the system to model unique, unusual, and non-standard business processes to the needed level of detail for accurate, high-quality outputs. In managing inventory decisions in production and service scenarios, typically the cost of fulfilment can be reduced, but the trade-off is less speed in replacement availability to affected customers. The simulation outputs many process performance objectives each of which may be optimized through single or multi-objective optimization for any simulation scenario, including with stochastic simulations. Multi-objective optimization enables visibility into the trade-offs between different performance objectives and enables businesses to choose the best balance of performance objectives for their process configuration.

The system enables identification and planning of most suitable inventory policy for set of parts across a global network of manufacturing centers, service centers, distribution centers and suppliers. The most suitable policy is chosen for the mix of demand and lead time across all parts. The system starts with simulating a variety of business scenarios and maps simulated material safety stocks and reorder points across a time horizon. Using the simulation results, the system can minimize service fulfilment time, fulfilment cost, and other objectives for a given demand mix under various constraints on lead time or available supply, logistics or production alternatives driving inventory at multiple centre locations.

Minimizing fulfilment time allows an inventory team of an organization to analyze scenarios under different demand mixes and supplier lead time scenarios to analyze the sensitivity of inventory levels and safety stocks for selected parts across the production and service networks. Also, as the demand mix changes in terms of scheduled and emergency service changes, the system helps the inventory team to re-optimize and analyze key decisions including the safety stocks and fulfilment cost.

The system offers configurable analytics which provide decision-makers with the methods, analytics, and necessary visualizations to analyze changed inputs in order to quickly arrive at the best configurations and operating parameters for part delivery and availability for production and service. In particular, it addresses how to optimize inventory policy to ensure on-time fulfilment at minimal fulfilment costs and to further analyze its sensitivity.

The system enables teams of supply network analysts, planners, and managers to systematically choose the inventory policy which drives the best production and service fulfilment levels. Broadly, the analysts collect required data which is submitted for replenishment planning. The system constructs a process simulation based on the data which the analyst can test and modify for model validation. Then, a supply network planner employs an optimization process to check for process performance across ranges of input parameters to find optimal sets of parameters achieving best fulfilment times and fulfilment costs. Appropriate options may be used to view the collected optimal sets and to choose the parameters best suited for deployment in the organization.

The system guides and enables supply network analysts to submit process knowledge and data, such as from time and motion studies, and to submit data from external sources, such as supplier lead times and demand. The data submission process should occur very infrequently and enables the system to generate simulations based on networks and sub-networks represented in the submitted data. The system may be used to construct a full process simulation with scenarios defined by the compiled data. The system further allows validation by running simulations with varying parameters, such as demand load and lead times, and with varying inputs, such as the inventory safety stocks, and verifies that the results align with the process while making modifications as needed.

The system further enables a supply network planner to check which parameter ranges and inputs have strong effects on the service fulfilment performance. In this validation, the planner may choose from a set of parameters generated by the system, which can be varied and simulated. After the planner chooses a parameter (e.g. time to complete a specific repair on a product at a service center) and a range of values for the parameter, the system simulates the scenario a configurable number of times for every value in the range. The planner may then use various routines in the replenishment planner to determine the most suitable inventory safety stocks, measured in terms of service fulfilment, for each set of interesting parameters. In optimization, the planner chooses which parameter values to set for which the system determines the safety stock values which optimize on-time delivery. This optimization can facilitate managing material replenishment for on-time service across the network at both strategic and operational levels.

Further, the system allows inventory planners to visualize and compare the optimal safety stocks and their corresponding service fulfilment levels across each set of parameters, and further, uses the system to construct the optimal sets based on the chosen rankings of objectives and parameters or the chosen weights to objectives and parameters, and by visualizing the parameter and objective trade-offs among the solutions.

Referring now to the drawings, and more particularly to FIG. 1 through FIG. 13, where similar reference characters denote corresponding features consistently throughout the figures, there are shown preferred embodiments and these embodiments are described in the context of the following exemplary system and/or method.

FIG. 1 illustrates block diagram of a system for material replenishment, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of material replenishment planning, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the material replenishment planning.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2 and FIG. 3, and the example diagrams from FIG. 4 through FIG. 13.

Figure 2:
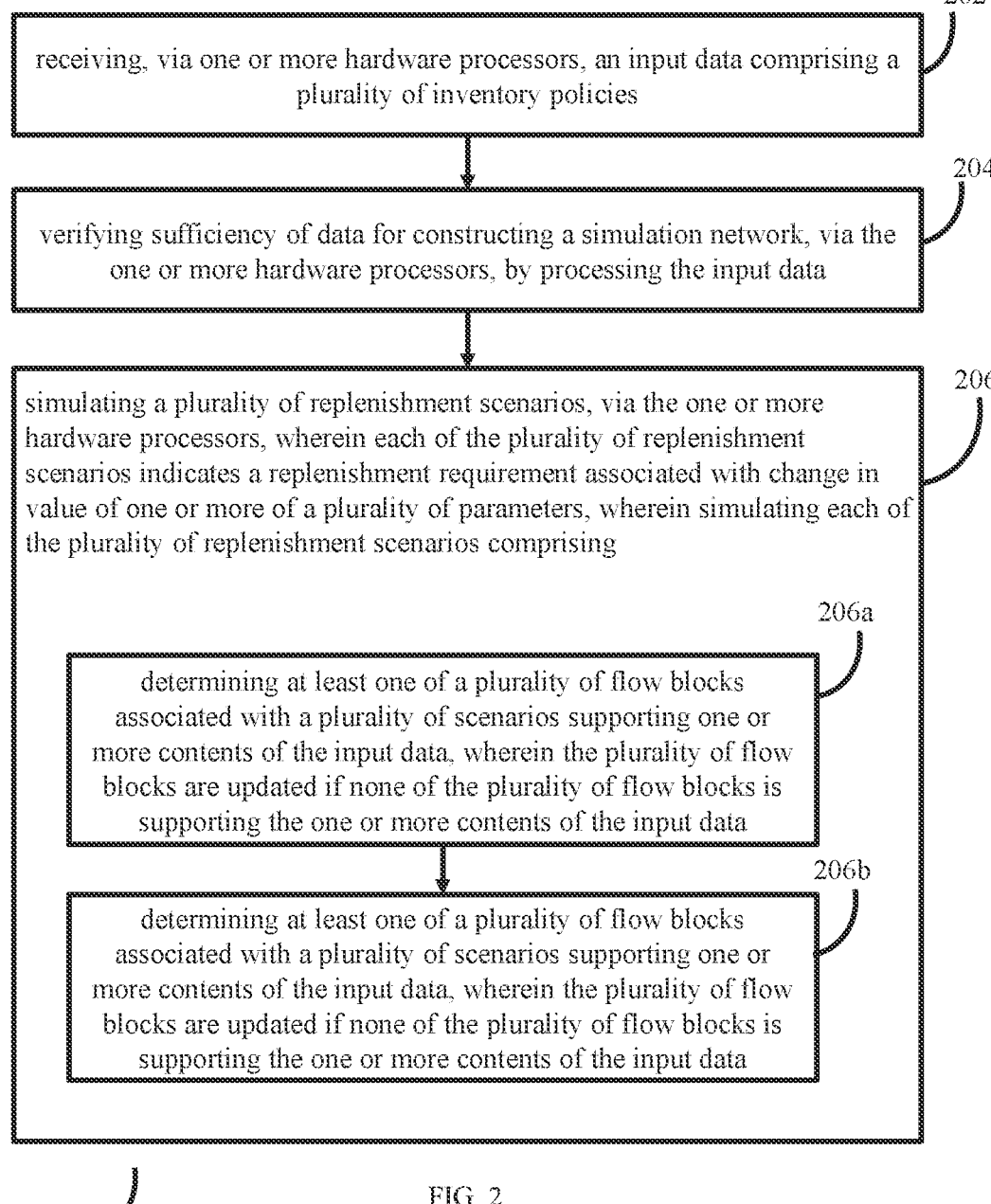
FIG. 2 is a flow diagram depicting steps involved in the process of material replenishment being performed by the system of FIG. 1, according to some embodiments of the present disclosure.

FIG. 2 is a flow diagram depicting steps involved in the process of material replenishment being performed by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, initially the system 100 receives an input data comprising a plurality of inventory policies, via the one or more hardware processors 102. Each of the plurality of inventory policies may include a standard set of guidelines with boundaries that allows an organization to make informed make or buy inventory investment decisions, and also balances delays and costs. In an embodiment, the plurality of inventory policies may be received along with one or more other supporting information, which together forms a master data. For example, the one or more other supporting information may include, but not be limited to information on one or more scenarios, parts, products, manufacturing centers, and distribution centers. In an embodiment, the step of obtaining the master data may be a onetime process albeit with minor adjustments and additions as needed. In an embodiment, the user may be provided an option to upload the master data on a record-by-record basis. In another embodiment, uploading the master data may be automated using an appropriate API.

Further, at step 204 of the method 200, the system 100 performs a sufficiency of data verification, via the one or more hardware processors, by processing the input data, which involves checking and determining whether the received input data along with any other related data the system 100 may possess is sufficient for constructing a simulation network. At this stage, the system 100 is configured to initially perform network configuration. The network configuration involves choosing which Master Data elements would be part of the network and thus part of the simulation. This step involves selecting parts, products, manufacturing centers, distribution centers and more which are to be included in the network simulation. While the step of obtaining the input data may occur only once, the network configuration may be repeated, however, in limited iterations.

Figure 10:
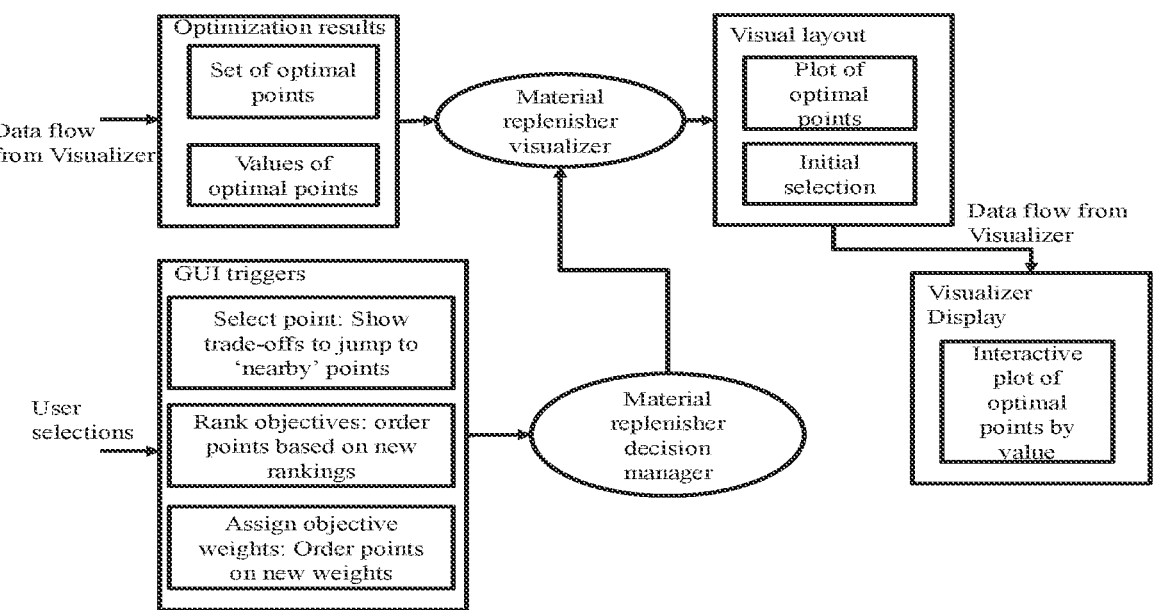
FIG. 10 illustrates an example of a material replenisher decision planner and material replenisher visualizer data flow, of the system of FIG. 1 (alternately referred to as material replenisher planner) for the material replenishment, in accordance with some embodiments of the present disclosure.

A network formed by various stakeholders of the material replenishment process is referred to as MRPO Network (also referred to as "network" or "MRPO"). The MRPO network may include various components/modules, as covered in the following explanation, which may be implementation of the one or more hardware processors 102. The MRPO network is also a collection of user-selected master data objects validated by a Material Replenisher Flow Configurator of the MRPO network. The validation ensures that the simulation can be created and executed using the selected data objects. Table 2 describes a validation sequence used by the system 100. A valid collection of connected, instantiated Master Data is considered to be the MRPO Network, from which an executable simulation can be generated by instantiating each of a plurality of Flow Blocks contained in the network. Once Material Replenisher Planner creates the executable simulation, users can run the simulation by specifying the safety stocks of the part inventories of their product service centre. An example architecture of the Material Replenisher Planner is depicted in FIG. 10. The simulation output gives the time-in-system of each product. Higher safety stock values may typically yield shorter time-in-service values. Users can simulate different re-order values and different parameter values to explore the best configuration for their production and service processes. Examples of flow blocks generating simulation events for a given MRPO network is given in Table 3. MRPO provides a convenient interface to simulate a particular set of safety stock values while varying a specified parameter value to easily see the parameter's effects on the product time-in-system. After the planner chooses a parameter (e.g. time to complete a specific repair on a product at a service centre) and a range of values for the parameter, the MRPO simulates the scenario a configurable number of times for every value in the range. Similarly, the interface easily allows a set of simulations which vary one safety stock to see the effect of a particular safety stock on the product time-in-system.

TABLE 1

| MPRO data categories and their fields. Collections of records of each category may be combined to form a MRPO network. | | |
|---|---|---|
| Category | Symbol | Fields |
| Manufacturing Center | N^mfg | Latitude, Longitude, Number of Raildocks, Number of Truckdocks, Storage Area, List of Finished Goods, List of Parts |
| Service Center | N^svc | Latitude, Longitude, Number of Raildocks, Number of Truckdocks, Storage Area, List of Services, List of Parts |
| Distribution Center | N^dc | Latitude, Longitude, Number of Raildocks, Number of Truckdocks, Storage Area, List of Parts |
| Supplier Center | N^sup | Latitude, Longitude, Number of Raildocks, Number of Truckdocks, Storage Area, List of Parts |
| Service | I^s | Complexity, Chance of Extended Duration, List of Components |
| Part | I^p | Family, Sub-family, Length, Width, Height |
| Finished Good | I^f | Family, Sub-family, Length, Width, Height, List of Components |
| Route | R | Start Location, End Location, Duration, Fixed Cost, Variable Cost, Mode, Default Indicator |
| Finished Goods Components | C^fg | Finished Good, Part or Finished Good, Quantity of Part |
| Service Components | C^s | Service, Part or Finished Good, Quantity of Part |
| Production Configuration | C^mfg | Manufacturing Center, Finished Good, Batch Cost, Number of Bays, Unit Manufacturing Duration, Duration Cost, Number of Orders |
| Service Configuration | C^svc | Service Center, Service, Batch Cost, Number of Bays, Service Duration, Duration Cost, Number of Orders |
| Supply Configuration | C^sup | Supplier Center, Part, Batch Size, Capacity, Unit Cost |
| Inventory Configuration | C^inv | Manufacturing Center or Service Center or Distribution Center or Supplier Center, Part or Finished Good, Capacity, Batch Size, Holding Cost, Starting Quantity, Safety Stock, Unit Cost, Move Duration, List of Sources |

TABLE 2

| MRPO Network validation conditions define whether a collection of data records constitute a valid network. | |
|---|---|
| User Selection | Validation Condition |
| If at least one n in N^mfg | must have at least one c in C^mfg such that the Manufacturing Center of c is n and must have every f in I^f such that f is the Finished Good of c and must have every p in I^p if p is in the List of Components of f and must have exactly one e in C^fg for every component p of every Finished Good f and must have exactly one i in C^inv for every p such that the Part of i is p |
| If at least one n in N^svc | must have at least one c in C^svc such that the Service Center of c is n and must have every s in I^s such that s is the Service of c and must have every p in I^p if p is in the List of Components of s and must have exactly one e in C^s for every component p of every Service s and must have exactly one i in C^inv for every p such that the Part of i is p |
| For every i in C^inv such that the location of i is not a Supplier Center | must have at least one location I in the List of Sources of i and must have j in C^inv such that the location of j is I and the Part of j matches the Part of i and must have at least one r in R such that the Start of r is I and the End of r is the location of i |
| For every s in N^sup | must have exactly one c in C^sup such that the |

TABLE 2-continued

MRPO Network validation conditions define whether a collection
of data records constitute a valid network.

| User Selection | Validation Condition |
|---|---|
| such that s is in the | Part of i is the Part of c and the Supplier Center of |
| List of Sources of a selected inventory i in C^inv | c is s |

The validation ensures that the network has appropriate data to run a simulation i.e. the sufficiency of data is verified at this step. Every manufacturing centre and service centre in the network are creating products and performing services, both of which require parts. All the required parts must have inventories configured at those centers and upstream sources from which to acquire more parts. Each part is traced from manufacturing or service centre inventory, to an upstream node which provides that part and from that node to the next upstream node, and so on and so forth, until a supplier is reached. Suppliers do not need to have part sources as they themselves produce parts. For a network to be simulated, every part at every manufacturing or service centre is required to have an upstream path to a supplier and all supporting data. Supporting data means that if a Production Configuration is in the network to produce FG 1 at MFG 1 then both the Finished Good FG 1 must exist in the network and the Manufacturing Centre MFG 1 must exist as well.

Further, at step 206 of the method 200, the system 100 simulates a plurality of replenishment scenarios, via the one or more hardware processors 102, wherein each of the plurality of replenishment scenarios indicates a replenishment requirement associated with change in value of one or more of a plurality of parameters. Simulating each of the plurality of replenishment scenarios includes steps 206a and 206b.

At step 206a, at least one of a plurality of flow blocks associated with a plurality of scenarios supporting one or more contents of the input data is determined, wherein the plurality of flow blocks are updated if none of the plurality of flow blocks is supporting the one or more contents of the input data.

TABLE 3

Flow blocks generate simulation events for a given
MPRO network initialized by its constituent data

| Flow Block | Purpose | Definition |
|---|---|---|
| FGProduction | Generate events which simulate a Finished Good production batch at a Manufacturing Center, including verifying part availability, delays, and costs | Algorithm 1 |
| ServiceProduction | Generate events which simulate a Service production batch at a Service Center, including verifying part availability, delays, and costs | Algorithm 2 |
| PartStaging | Generate events which simulate moving Part from inventories to a staging area at a facility, such as to prepare for shipping or production | Algorithm 3 |
| PartPutaway | Generate events which simulate moving Part from a | Algorithm 4 |

TABLE 3-continued

Flow blocks generate simulation events for a given
MPRO network initialized by its constituent data

| Flow Block | Purpose | Definition |
|---|---|---|
| | staging area to an inventory at a facility, such as after receiving a shipment | |
| PartReceive | Generate events which simulate taking Part from trucks or train cars and into a facility | Algorithm 5 |
| Shipment | Generate events which simulate moving Part from one location to another | Algorithm 6 |
| PartSend | Generate events which simulate taking Part from a facility to trucks or train cars | Algorithm 7 |
| PartCreate | Generate events which simulate Supplier Center Part production | Algorithm 8 |
| OrderCreate | Generate events which simulate Finished Good and Service orders | Algorithm 9 |
| InvCheck | Generate events which simulate inventory monitoring and placing replenishment orders | Algorithm 10 |

Each flow block is a self-contained discrete-event simulation model of a granular industrial process. Consider for example a shipment process which simulates the traveling time of a shipment. The logic of this shipment process is as follows: It takes as input the number and types of parts being shipped, the mode of shipment, and the number of shipping vessels. If the user has configured Monte Carlo shipping durations, the shipment process uses a MRPO random number generator of the MRPO network, executed by the one or more hardware processors 102, to generate a duration based on the user-supplied distribution in the Master Data. If not using Monte Carlo shipping durations, the duration is set directly from the Master Data. Then, the process emits a delay event to the discrete-event simulation engine for the duration. Finally, once the delay event is executed and the simulation increased by the duration amount by the discrete-event simulation framework the shipment process outputs the number and types of parts which were delivered as well as the number and types of vessels performing the shipment.

Many Flow Blocks of each type may be created by the system 100 and may be linked to other blocks. This is depicted in the example diagram in FIG. 13. Though each type of block implements the same type and order of events, the duration of events and the simulation state changes depending on the simulated inputs and how the system 100 configures each block from the Master Data. The system 100 may configure only those blocks which are supported by Master Data. For example, if Putaway Duration data is not available for a particular Distribution Center, then the system 100 may configure a DC Shipment Arrive Process block for the simulation and instead adds the parts to the Distribution Center inventory with no time delay. In this way, the system 100 automatically configures the simulation to the fidelity allowed by the user-submitted data. Although the system 100 may require a minimum data set to construct a network simulation, it is able to automatically increase the fidelity of the simulation if appropriate data is available and is often able to automatically skip blocks when the data is not available, or data is malformed, or data is identified or marked as invalid. The blocks are configured to be self-contained, hence they do not require information on from which blocks inputs are coming nor to which blocks the outputs are going. Each block contains intrinsic events for partially computing objectives (e.g. total fulfillment cost, total production delay) such that the objectives for individual blocks can be combined with all blocks to compute the objectives across the simulation. Not every block necessarily contributes to every objective and the rules for combining the output objectives of each block is individually mapped and programmed to ensure the combination logic correctly determines the objective. This functionality enables optimization capabilities for any simulation composed of blocks, assuming the optimizer has algorithms equipped for the type of decision variables chosen and number of objectives. Mapping of sample input data fields to sample material replenisher flow planner blocks is given in Table 4.

TABLE 4

Mapping of Sample Input Data Fields to Sample
Material Replenisher Flow Planner blocks

| Sample Flow Blocks | Required Inputs | Corresponding Master Data Fields |
|---|---|---|
| Manufacture FG Process | MFG Center, FG, Duration, Parts required | MFG Center ID, FG ID, Assembly Duration, Part ID's |
| DC Shipment Arrive Process | DC, Parts, Batch Putaway Duration per Part ID, Shipment Quantity | DC ID, Part ID's, Putaway Duration, Quantity |
| Shipment Transport Process | Start location, End location, mode of travel, length, speed, cargo | Transport ID, Part ID's, Quantity, Speed, Length |
| DC Shipment Depart Process | DC, Parts, Batch Pick Duration per Part ID, Quantity | DC ID, Part ID's, Pick Duration, Quantity |
| Supplier Order Arrive Process | Supplier, Parts, Quantity | Supplier ID, Part ID's, Quantity, Destination ID, Due Date |

Many Flow Blocks of each type may be created by the system 100 and linked to other blocks. Though each type of block implements the same type and order of events, the duration of events and the simulation state changes depend on the simulated inputs and how the system 100 configures each block from the Master Data. For example, each Shipment Transfer Process is created, in part, by setting the duration to the corresponding Transportation Duration data in the Transportation Routes data table. Each block type has a set of inputs and outputs which must be compatible (in the sense that the outputs of a block must match the inputs of the next block) to create a connection. For example, the required inputs to a DC Shipment Arrive Process are the number and type of parts as well as the number and type of vessels. Thus, the input of DC Shipment Arrive Process corresponds to the output of the Shipment Transport Process. However, the Manufacture FG Process requires the number and type of parts and the number and type of finished goods as input. Thus, the Shipment Transport Process cannot be linked to the input of Manufacture FG Process. An example Manufacturing Center node and its constituent Flow Blocks can be simulated either by itself or as part of a larger network with many nodes and processes.

The system 100 may configure only those blocks which are supported by Master Data. For example, if Putaway Duration data is not available for a particular Distribution Center, then the system 100 may not configure a DC Shipment Arrive Process block for the simulation and instead adds the parts to the Distribution Center inventory with no time delay. In this way, the system 100 automatically configures the simulation to the fidelity allowed by the user-submitted data. Although the system 100 requires a minimum data set to construct a network simulation, it is able to automatically increase the fidelity of the simulation if appropriate data is available and is often able to automatically "skip" blocks when the data is not available, or data is malformed, or data is invalid.

Further, at step 206b, one or more simulation results are generated for the input data, based on the master data with respect to a plurality of parts and products, one or more materials, one or more flow facilities, one or more facility roles, one or more business policies, and a safety stock information, wherein, the one or more simulation results for the input data forms a training data.

Further, a deep learning data model is trained using the training data. The deep learning model may be then used by the system 100 to generate one or more recommendations in response to a user query. Generating the one or more recommendations includes the following steps as depicted in method 300 in FIG. 3. Initially, at step 302 of the method 300, the user query is received as input, wherein the user query is with respect to values of one or more of the plurality of parameters. For example, the user may want to get replenishment related recommendations, for a given set of values of a plurality of parameters. In an embodiment, the user query may be with respect to simulating a new replenishment scenario. In another embodiment, the user query may be with respect to changing values of one or more parameters of an existing replenishment scenario simulated. For example, a replenishment scenario may have been simulated in an iteration, and in subsequent iteration the user may want to experiment with a different value of one or more of the parameters forming the replenishment scenario. For example, change value of number of specific items in stock, supply requirements, and so on.

Further, an algorithm matching the received user query is selected from among a plurality of algorithms, at step 304 of the method 300. In order to select the algorithm, the system 100 determines which among a plurality of flow blocks are instantiable from the available master data, and based on the determined instantiable flow blocks, the flow blocks are ordered and linked according to the material flow. For example, if the master data is available to instantiate a Shipment and a PartRecieve flow block but not PartStaging nor PartPutaway flow blocks, then the system 100 orders the available blocks 1) Shipment, and 2) PartReceive, and links the outputs of the Shipment block to the input of the PartReceive block, omitting the PartStaging and PartPutaway blocks for which system data is not available. Below are some of the examples of different algorithms that may be used by the system 100.

---

Algorithm 1: FGProduction input : Validated Network V, Production Configuration m, quantity q
output: set of events E
E ← ø
f ← Finished Good of m;
l ← Manufacturing Center of m;
P ← p ∈ V ∩ l˜P such that p is a component of f;
for a in p do
    C_a ← c ∈ V ∩ C˜fg such that f is the Finished Good of c and a is the Part of c;
        n ← Quantity of C_a
        i ← i ∈ V ∩ C˜inv such that a is the Part of i and l is the
    Manufacturing Center of i;
        E ← E ∪ Event(Wait for q x n of a from i);

-continued

Algorithm 1: FGProduction b ← Number of Bays of m;
E ← E ∪ Event(Wait for b Bays at l);
d ← Unit Duration of m;
E ← E ∪ Event(Wait for q units for an average of d duration each split across b bays);
E ← E ∪ Event(Release b bays immediately);

Algorithm 1 generates production events which simulate production for one production configuration of a given network. A Production Configuration links a Finished Good with a Manufacturing Center and all data associated with producing that Finished Good at that Manufacturing Center. Therefore, the generated events simulate production of the Finished Good at the Manufacturing Center of the given Production Configuration. The inputted quantity is seeded based on the production configuration by may vary based on any existing shortfall or delay.

Algorithm 2: ServiceProduction input : Validated Network V, Service Configuration s, quantity q
output: set of events E
E ← ø
f ← Service of s;
l ← Service Center of s;
P ← p ∈ V ∩ I^P such that p is a component of f;
for a in p do
   C_a ← c ∈ V ∩ C^S such that f is the Service of c and a is the Part of c;
   n ← Quantity of C_a;
   i ← i ∈ C^inv such that a is the Part of i and l is the Service Center of i;
   E ← E ∪ Event(Wait for q x n of a from i);
b ← Number of Bays of s;
E ← E ∪ Event(Wait for b Bays at l);
d ← Unit Duration of s;
E ← E ∪ Event(Wait for q units for an average of d duration each split across b bays);
E ← E ∪ Event(Release b bays immediately);

Algorithm 2 generates servicing events which simulate service performance for one service configuration of a given network. A Service Configuration links a Service with a Service Center and all data associated with performing that Service at that Service Center. Therefore, the generated events simulate performance of the Service at the Service Center of the given Service Configuration. The inputted quantity is seeded based on the service configuration by may vary based on any existing shortfall or delay.

Algorithm 3: PartStaging input : Validated Network V, location l, set of Parts p, set of corresponding quantities Q
output: set of events E
E ← ø
for i in 1, ..., |P| do
  j ← i ∈ V ∩ C^inv such that l is the location of i and a_i is the Part of i;
   E ← E ∪ Event(Wait for Q_i of a_i from j);
   E ← E ∪ Event(Wait for Move Duration of i and decrement quantity);

Algorithm 3 generates events which simulate moving parts at some location to a staging area within that location. Staging areas are temporary part storage areas which are neither inventories nor transports. For example, some facilities may unload trucks first into a staging area instead of directly to inventory.

Algorithm 4: PartPutaway input : Validated Network V, location l, set of Parts p, set of corresponding quantities Q
output: set of events E
E ← ø
for i in 1, ..., |P| do
  j ← i ∈ V ∩ C^inv such that l is the location of i and a_i is the Part of i;
   E ← E ∪ Event(Wait for Move Duration of i and increment quantity);

Algorithm 4 generates events which simulate moving parts from either a transport or a staging area and places them into inventory at a location.

Algorithm 5: PartReceive input : Validated Network V, location l, set of Parts p, set of corresponding quantities Q
output: set of events E
E ← ø
for i in 1, ..., |P| do
  j ← i ∈ V ∩ C^inv such that l is the location of i and a_i is the Part of i;
   E ← E ∪ Event(Wait for Unload Duration of i and decrement quantity);
   E ← E ∪ Event(Wait for Move Duration of i and increment quantity);

Algorithm 5 generates events which simulate moving parts from some transport arrival and into either and inventory or a staging area.

Algorithm 6: Shipment input : Validated Network V, Route r, set of Parts p, set of corresponding quantities Q
output: set of events E
E ← Event(Wait for Route Duration);

Algorithm 6 generates events which simulate transporting parts from one location to another along a route.

Algorithm 7: PartSend input : Validated Network V, location l, destination d, set of Parts p, set of corresponding quantities Q
output: set of events E
E ← ø
for i in 1, ..., |P| do
  j ← i ∈ V ∩ C^inv such that l is the location of i and a_i is the Part of i;
   E ← E ∪ Event(Wait for Q_i of a_i)
r ← V ∩ R such that l is Start of r and d is End of r;
E ← E ∪ Event(Initiate Shipment(V, r, p, Q));

Algorithm 7 generates events which simulate collecting and loading parts into a transport and initiating shipment.

Algorithm 8: PartCreate input : Validated Network V, Supply Configuration s
output: set of events E
E ← ø
l ← location of s;
p ← Part of s;
i ← j ∈ V ∩ C^inv such that location of j is l and Part of i is p;
c ← Capacity of s;
while True do
   E ← E ∪ Event (Create c of p in i immediately);

-continued

---
Algorithm 8: PartCreate
---

E ← E ∪ Event(Wait 1 time unit);

---

Algorithm 8 generates events which simulate realization of supplier capacity each day for which orders can be placed from downstream inventories.

---
Algorithm 9: OrderCreate
--- input : Validated Network V, location l, Part, Finished Good, or Service w, quantity q
output: set of events E
E ← ø
if w ∈ V ∩ l^f then
  m ← f ∈ V ∩ C^mfg such that l is the Manufacturing Center of m and w is the Finished Good;
  E ← E ∪ Event(FGProduction(V, m, q);
if w ∈ V ∩ l^s then
  m ← f ∈ V ∩ C^svc such that l is the Service Center of m and w is the Service;
  E ← E ∪ Event(ServiceProduction(V, m, q);

---

Algorithm 9 generates events which simulate the production and service schedules by creating orders at the Manufacturing and Service Centers for the corresponding Finished Goods and Services.

---
Algorithm 10: InvCheck
--- input : Validated Network, inventory i
output: set of events E
E ← ø
l ← location of i;
p ← Part of i;
b ← Batch Size of i;
s ← Reorder Point of i;
while True do
  if Current Quantity of i ≤ s + b * |Q| then
    n ← b
    while n > 0 do
      for j in List of Sources of i do
        q ← Current Quantity of j;
        if q ≤ n then
          E ← E ∩ Event(Partsend(V, j, l, p, n))
          n ← 0
        else
          E ← E ∩ Event(Partsend(V, j, l, p, n))
          n ← n − q
        E ← E ∪ Event(Wait till start of next cycle);
  E ← E ∪ Event(Wait till start of next cycle);

---

Algorithm 10 generates events which simulate the monitoring of inventories in the network and places replenishment orders when the re-order point is reached. The algorithm accounts for in-route replenishments and whether the list of sources can fulfill the replenishment.

Further, at step 306 of the method 300, the user query is processed using the selected algorithm to simulate one or more replenishment scenarios associated with the user query. This process is explained with reference to the example implementations in FIG. 4 through FIG. 12.

Figure 5:
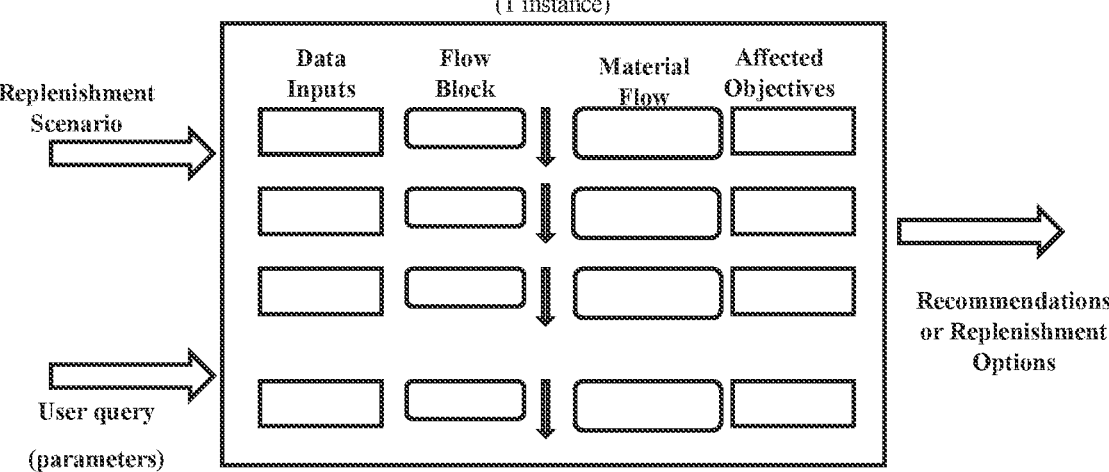
FIG. 5 illustrates an example of various inputs and outputs of the system of FIG. 1 (alternately referred to as material replenisher planner) for the material replenishment, in accordance with some embodiments of the present disclosure.

Each block from among the flow block diagrams in FIG. 4 through FIG. 12 contains intrinsic events for partially computing objectives (e.g. total fulfilment cost, total production delay) such that the objectives for individual blocks can be combined with all blocks to compute the objectives across the simulation. Not every block necessarily contributes to every objective and the rules for combining the output objectives of each block are individually mapped and programmed to ensure the combination logic correctly determines the objective. This functionality enables optimization capabilities for any simulation composed of blocks, assuming the optimizer has algorithms equipped for the type of decision variables chosen and number of objectives. The system 100 may select an optimization algorithm, from among a plurality of optimization algorithms. For the selection of the optimization algorithm, the system 100 determines one or more fundamental algorithm requirements from a problem being solved, based on Table 5. Based on data in Table 5, only a subset of the available optimization algorithms may be suitable. From that subset, the system 100 selects the algorithm based on one or more of a plurality of priorities. A few examples of the plurality of priorities are, but not limited to, convergence guarantee, convergence rate, and default simulation budget (lower is better). In an embodiment, a user may override a system selection of the optimization algorithm, if required. Various inputs and outputs of the material replenisher planner are depicted in FIG. 5.

Once Material Replenisher Planner creates the executable simulation, the simulations can be executed, may be based on inputs from the user, wherein safety stocks of the part inventories of their product service centre may be specified as input by the user. The simulation output gives the time-in-system of each product. Higher safety stock values yield shorter time-in-service values. Based on different user inputs, different re-order values and different parameter values are simulated to explore the best configuration for a given product service process. The system 100 provides an interface to simulate a particular set of safety stock values while varying a specified parameter value to easily see the parameter's effects on the product time-in-system. After the planner chooses a parameter (e.g. time to complete a specific repair on a product at a service centre) and a range of values for the parameter, the system 100 simulates the scenario a configured number of times for every value in the range. Similarly, the interface allows a set of simulations which vary one safety stock to see the effect of a particular safety stock on the product time-in-system.

There are two input categories in the example scenario depicted in FIG. 5. The first is the MRPO Network previously configured by the user, containing a user-chosen collection of data in the types of Table. 1 such that validation is successful. The second category of inputs is an optional opportunity for the user to override one or more specific fields of the data collection. For example, if the user wants to check how a demand increase at a manufacturing centre for a particular finished good affects the total fulfilment delay, the user can override the number of orders field of the Production Configuration data associated with the desired manufacturing centre and finished good with a larger number and analyze the impact. For users choosing to leverage one or more of the currently configured six planning alternatives, the system 100 automatically generates the input forms for any chosen network which enables users to create an alternative.

Inputs and Outputs of a Material Replenisher Optimizer of the MRPO network, implemented by the one or more hardware processors 102, are depicted in FIG. 6. Through the simulation interface, users obtain intuition about the parameter and safety stock effects on the product time-in-system. However, the Material Replenisher Optimizer of the MRPO provides an optimization interface which may implement one or more known simulation optimization algo-

19

Figure 7:
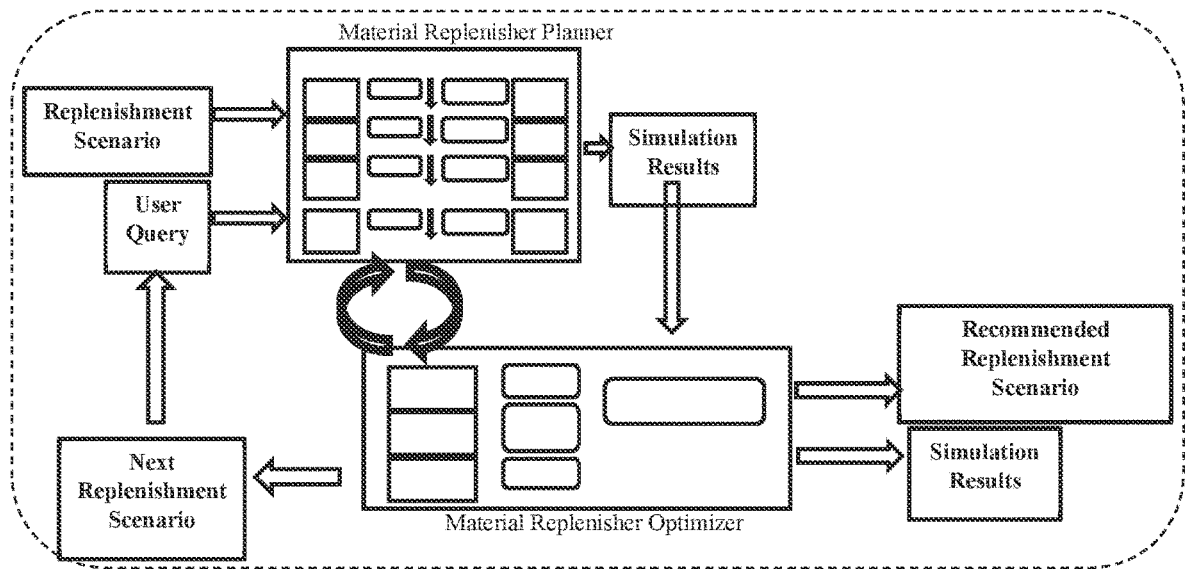
FIG. 7 illustrates an example of interaction between the material replenisher optimizer and a material replenisher planner of the system of FIG. 1 (alternately referred to as material replenisher planner) for the material replenishment, in accordance with some embodiments of the present disclosure.

20 rithms to find a set of safety stock which minimize the product time-in-system. Interaction between Material Replenisher Planner and Material Replenisher Optimizer for a single optimization instance is depicted in FIG. 7.

The optimization allows advanced simulation features such as running simulations in parallel for faster results and common random numbers for higher quality results. Users may run the optimization for different parameter values to decide how to configure the product service process. In optimization, the planner chooses which parameter values to set for which Material Replenisher Optimizer determines the safety stock values which optimize on-time delivery. Material Replenisher Optimizer contains a collection of simulation optimization algorithms and automatically chooses the most appropriate optimization algorithm when the user begins an optimization. The system 100 enables the user to select which parameters to vary and to select which objectives to optimize. The optimizer uses the following Table 5 to automatically choose the algorithm. Although additional objectives may be configured in a MRPO simulator of the MRPO, implemented by the one or more hardware processors 102, some examples objectives are listed below.

1. Total simulated delays in manufacturing and service for the entire network

2. Total simulated cost of the network consisting of the production costs, servicing costs, transportation costs, part purchase costs, part holding costs, and production and service penalties.

3. Total simulated penalty costs caused by production and service delays for the entire network 4. Total simulated production penalties 5. Total simulated service penalties 6. Total simulated number of part shipments 7. Total simulated number of inventory stock outs 8. Simulated number of stock outs at only Distribution Centers 9. Simulated production line and service bay utilization It is to be noted by a person skilled in the art that the set of algorithms listed in Table. 5 are for example purpose only, and does not intent to limit scope of the embodiments disclosed herein. Additional algorithms may be configured as required. Examples of various algorithm parameters are given below, for which default values may be automatically configured by the system 100.

1. Stochastic Gradient Descent

2. Kim and Ryu Bi-objective Trust Region

3. Multi-objective retrospective optimization using zigzag search (MOROZS)

4. Retrospective Search with Piecewise Linear Interpolation and Neighborhood Enumeration (R-SPLINE)

5. Retrospective Partitioned Epsilon-constraint with Relaxed Local Enumeration (R-PERLE)

6. Retrospective Minimization with Relaxed Local Enumeration (R-MinRLE)

7. Probabilistic branch and bound (PBnB)

8. Multi objective Probabilistic branch and bound (MOPBnB)

TABLE 5

Material Replenisher Optimizer selects the simulation optimization algorithm using the nature of the decision variables (which are chosen by the user from network parameters) and the number of objectives (chosen by the user from those implemented in MRPO).

| | | Nature of Decision Variables | | |
|---|---|---|---|---|
| | | Continuous | Integer-ordered | Mixed |
| Number of Objectives | 1 | Stochastic Gradient Descent | R-SPLINE | PBnB |
| | 2 | KR-TrustRegion | R-PERLE | MOPBnB |
| | 3 or more | MOROZS | R-MinRLE | MOPBnB |

When executing any of the algorithms, the system 100 may execute the following steps.

Mark the chosen parameters as decision variables so as to be manipulable by the optimizer and its algorithms Mark the chosen objective(s) so that those are considered by the optimizer and its algorithms and the non-chosen objectives are ignored Since some algorithms require an initial starting point, choose the starting point (a vector) to be the current values of the chosen decision variable parameters.

Choose which algorithm to apply as in Table 5.

Execute the algorithm with the previously chosen decision variables, objectives, starting point, as input. If not modified by the user, default algorithm-specific parameters are configured by the system 100.

Upon execution, each algorithm returns the following: 1) the set of decision variable (chosen parameter) values which optimize the objective(s) and 2) the set of optimal objective values for each chosen objective, and 3) algorithm-specific data collected during the routines.

Further, at step 308 of the method 300, the system 100 may generate one or more recommendations in response to the user query, wherein the one or more recommendations indicate one or more replenishment options associated with each of the one or more replenishment scenarios. A first form of recommendations generated by the system 100 are the results given by optimization algorithms which, given the replenishment scenario being optimized, the chosen parameters which become decision variables, the chosen simulation results to become objectives (indicating the measure of performance), and the algorithm-specific instantiation parameters, generated replenishment scenario parameterization, which is system recommended parameterization. A second form of recommendations are the comparative simulation results and visualizations given by the system 100, which, given the replenishment scenario and one or more alternatives, where alternatives are either modified parameter configurations or different replenishment scenario— generates the comparative view and analysis of simulation results, including the trade-offs for improving one performance metric at the expense of others. In the case the replenishment scenario or an alternative has a superior result in terms of relevance to user requirements, the system 100 recommends the same to the system 100. Otherwise, the system 100 recommends the collection of alternatives or replenishment scenarios with results, from which a user may choose the replenishment scenario with one or more desired trade-offs.

Figure 8:
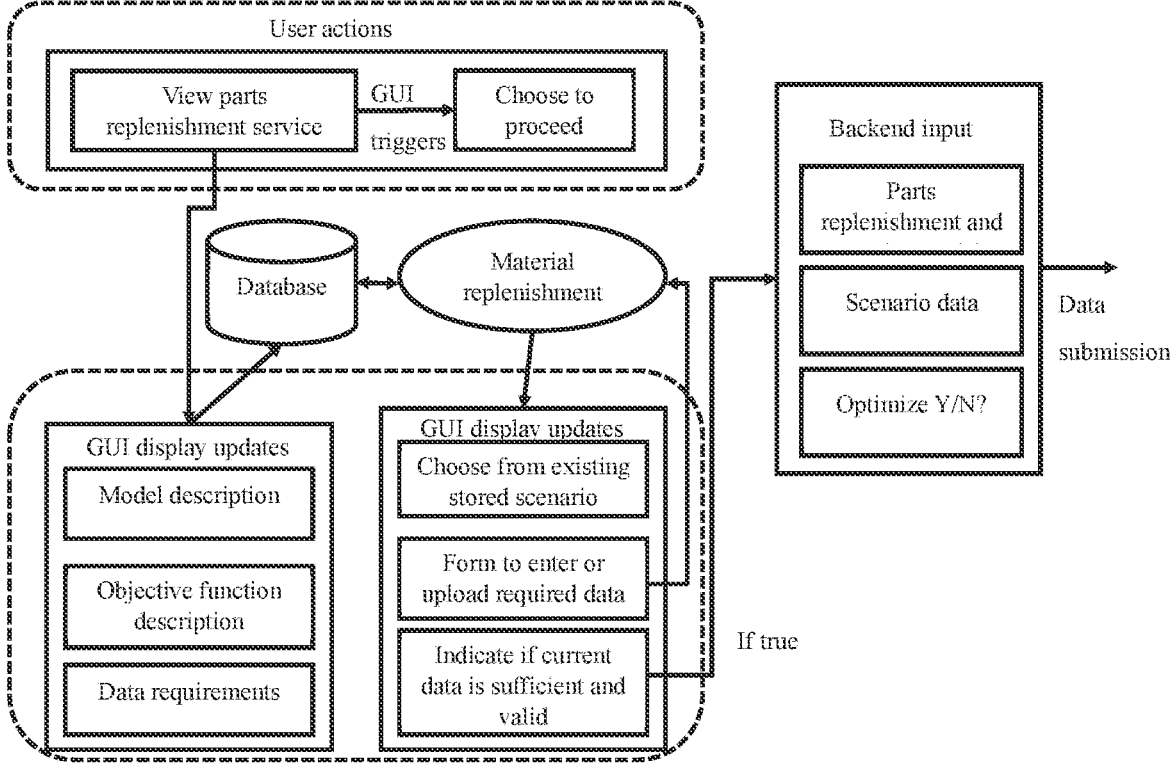
FIG. 8 illustrates an example overview of data submission and material replenisher flow planner data flow, of the system of FIG. 1 (alternately referred to as material replenisher planner) for the material replenishment, in accordance with some embodiments of the present disclosure.

An example MRPO Overview of Data Submission and Material Replenisher Flow Planner Data Flow is depicted in FIG. 8. The system 100 presents a graphical user interface (GUI) to users, which may show only a pre-configured model information about it including a description, the available objective functions for later optimization, and the data requirements. Input data may be then captured through the GUI. For example, the input data can be obtained in the following ways: 1) Users may select data from previous scenarios which are stored in the database, 2) Users may upload appropriately formatted files containing data, or 3) Users may enter data into forms directly in the GUI. The system 100 may verify the data sufficiency, and may indicate when data requirements are satisfied, at which point users may proceed to generate a simulation and perform optimization. Users submit the data while the Material Replenisher Flow Planner determines if the data submitted is sufficient to construct a working simulation. Starting with the user-submitted data, the system 100 generates a simulation using the pre-defined simulation "building blocks" of Material Replenisher Flow Planner, such as a truck loading process, a repair service process, etc., and mapping and initializing those blocks to elements in the data. The simulation uses the data previously inputted by the user as well as safety stock input by the user to simulate the system. The Material Replenisher Optimizer can access the generated simulation and perform optimization on the user's selected objectives. The users choose the parameter values for the optimization and the optimizer determines the safety stock values which enable on-time fulfilment.

Figure 9:
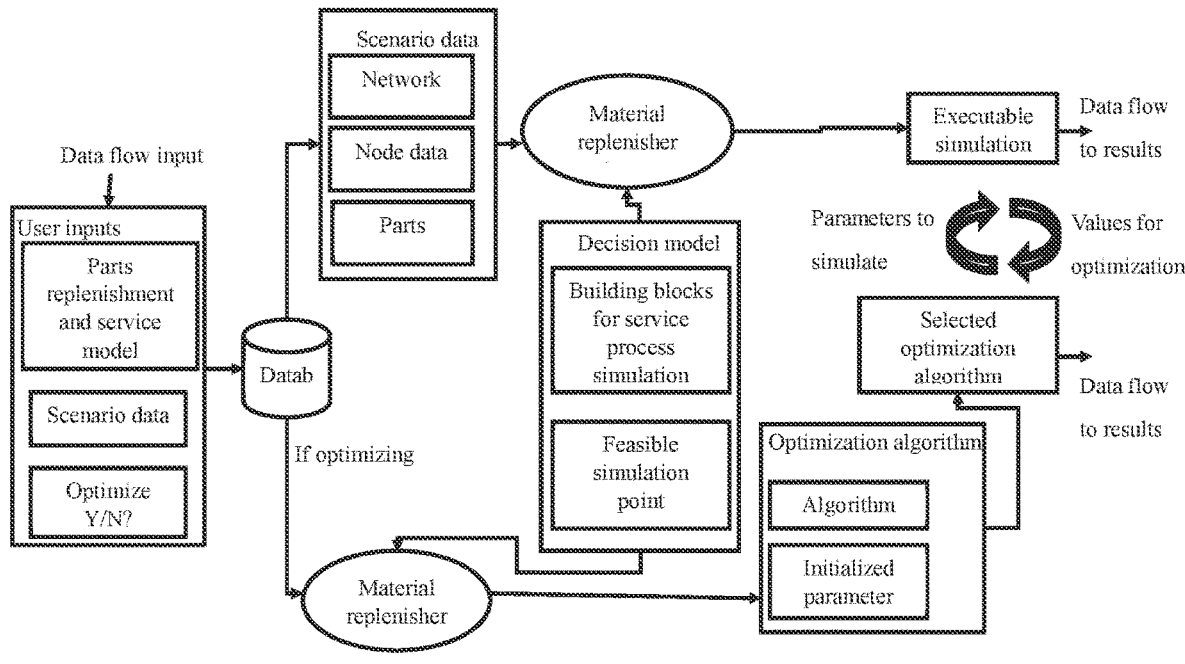
FIG. 9 illustrates an example of a material replenisher planner and material replenisher optimizer data flow, of the system of FIG. 1 (alternately referred to as material replenisher planner) for the material replenishment, in accordance with some embodiments of the present disclosure.
Figure 11:
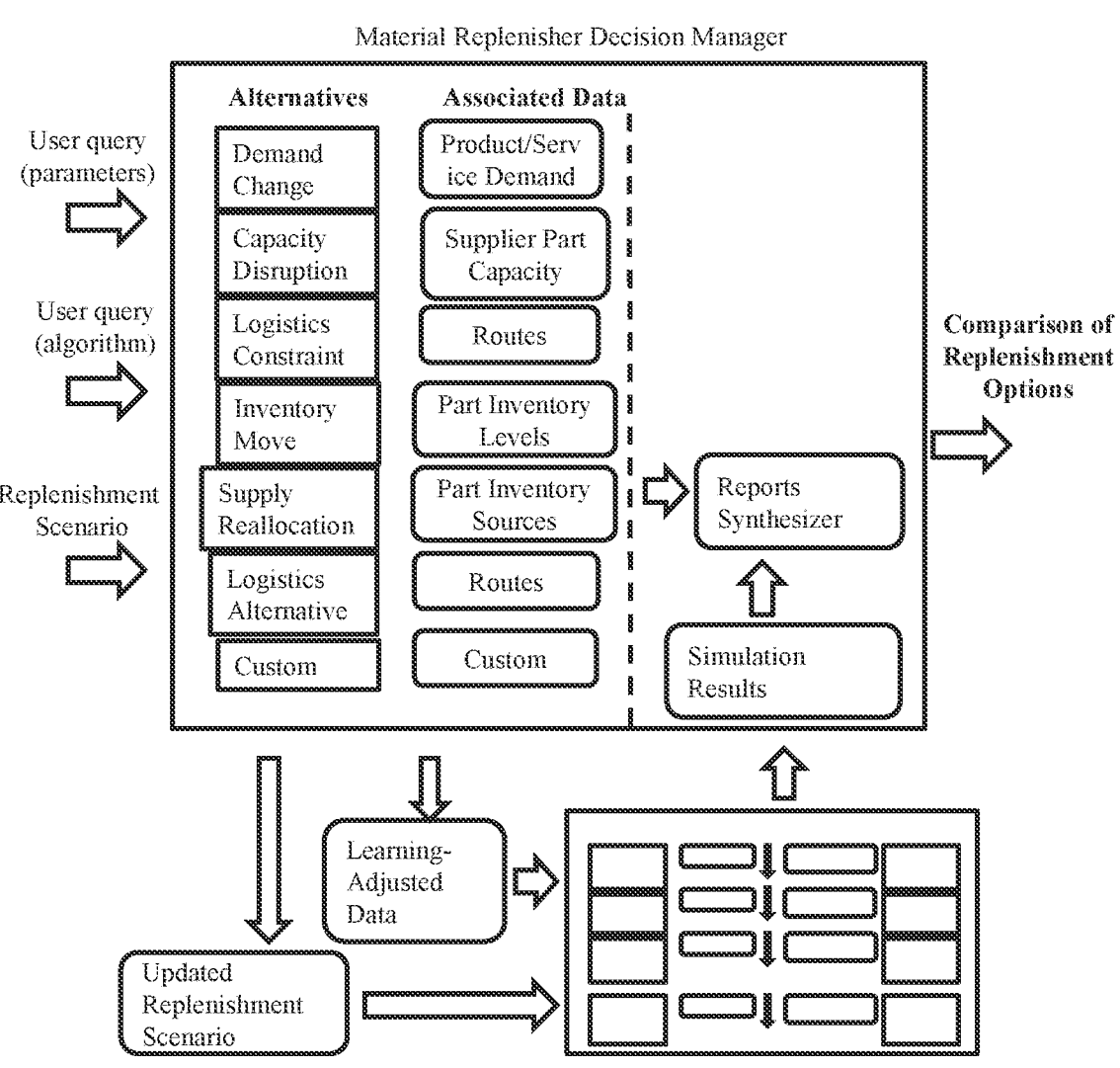
FIG. 11 illustrates an example of inputs and outputs of a material replenisher decision planner of the system of FIG. 1 (alternately referred to as material replenisher planner) for the material replenishment, in accordance with some embodiments of the present disclosure.
Figure 12:
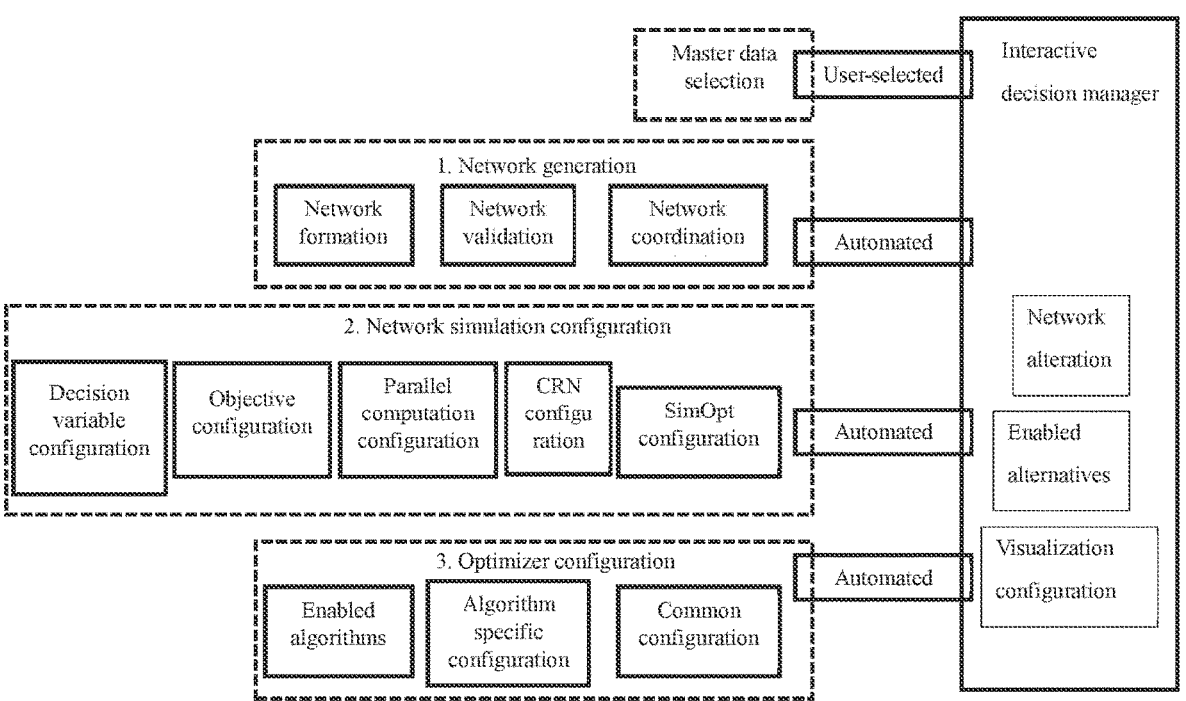
FIG. 12 illustrates different routines of the system of FIG. 1, for the material replenishment, in accordance with some embodiments of the present disclosure.

Material Replenisher Decision Planner and Material Replenisher Visualizer Data Flow are given in FIG. 9. After simulation and/or optimization, the system 100 displays the results to the GUI in the form of graphs, plots, charts, and other user-configurable analytic displays. The simulation results are sent to the Visualizer which presents them to the user. The Material Replenisher Visualizer also identifies simulation parameters of interest and provides one-click option for users to generate analysis by varying the parameter across multiple simulations. Various inputs and outputs of the MRPO are depicted in FIG. 11. Optimization results similarly go through the Visualizer which may map the optimization results to a plot style depending on the objective values and the number of objectives. From there, users may select from the plotted decision points and view their trade-offs, rank the objectives, or assign weights to the objectives. With each selection, the Material Replenisher Decision Manager computes the new ordering and layout of the optimal points and Material Replenisher Visualizer re-draws them to the GUI.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of material replenishment. The embodiment, thus provides a mechanism to simulate various replenishment scenarios in response to a user input received. Moreover, the embodiments herein further provide a mechanism to generate one or more recommendations for the material replenishment, in response to the received user input.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, via one or more hardware processors, an input data comprising a plurality of inventory policies;

verifying sufficiency of data for constructing a simulation network, via the one or more hardware processors, by processing the input data;

simulating a plurality of replenishment scenarios, via the one or more hardware processors, wherein each of the plurality of replenishment scenarios indicates a replenishment requirement associated with change in value of one or more of a plurality of parameters, wherein simulating each of the plurality of replenishment scenarios comprising:

determining at least one of a plurality of flow blocks associated with a plurality of scenarios supporting one or more contents of the input data, wherein the plurality of flow blocks are updated if none of the plurality of flow blocks is supporting the one or more contents of the input data; and generating one or more simulation results for the input data, based on a master data associated with a plurality of parts and products, one or more material one or more flow facilities, one or more facility roles, one or more business policies, and a safety stock information, wherein, the one or more simulation results for the input data forms a training data, wherein the master data is uploaded automatically using an application programming interface (API); and displaying the simulation results to a graphical user interface (GUI) in form of graphs, plots, charts, and user-configurable analytic displays, wherein the simulation results are sent to a Material Replenisher Visualizer and presented to a user;

providing, by the Material Replenisher Visualizer, a one-click option for the user to generate analysis by varying the parameters across multiple simulations;

mapping optimization results in a plot style depending on objective values and number of objectives by the Material Replenisher Visualizer;

allowing users to select to view trade-offs, rank objectives, assign weights to the objectives by the Material Replenisher Visualizer;

computing an order with each selection by the user; and re-drawing a layout of points for the order in the GUI.

2. The method of claim 1, wherein a deep learning data model is trained using the training data.

3. The method of claim 2, wherein the deep learning data model is used to generate one or more recommendations in response to a user query, comprising:

receiving the user query as input, wherein the user query is associated with values of one or more of the plurality of parameters;

selecting an algorithm matching the received user query, from among a plurality of algorithms;

processing the user query using the selected algorithm to simulate one or more replenishment scenarios associated with the user query; and generating the one or more recommendations in response to the user query, wherein the one or more recommendations indicate one or more replenishment options associated with each of the one or more replenishment scenarios.

4. The method of claim 3, wherein the user query is associated with values of one or more of the plurality of parameters of a) an existing replenishment option, or b) a new replenishment option to be simulated.

5. The method of claim 1, wherein each of the plurality of inventory policies encompasses a standard set of guidelines with respect to inventory transaction by at least one organization.

6. The method of claim 1, wherein the one or more recommendations may comprise comparison between the one or more replenishment options, emphasizing one or more differences between the one or more replenishment options.

7. A system, comprising:

one or more hardware processors;

a communication interface; and a memory storing a plurality of instructions, wherein the plurality of instructions when executed, cause the one or more hardware processors to:

receive an input data comprising a plurality of inventory policies;

verify sufficiency of data for constructing a simulation network, by processing the input data;

simulate a plurality of replenishment scenarios, wherein each of the plurality of replenishment scenarios indicates a replenishment requirement associated with change in value of one or more of a plurality of parameters, wherein simulating each of the plurality of replenishment scenarios comprising:

determining at least one of a plurality of flow blocks associated with a plurality of scenarios supporting one or more contents of the input data, wherein the plurality of flow blocks are updated if none of the plurality of flow blocks is supporting the one or more contents of the input data; and generating one or more simulation results for the input data, based on a master data associated with a plurality of parts and products, one or more material one or more flow facilities, one or more facility roles, one or more business policies, and a safety stock information, wherein, the one or more simulation results for the input data forms a training data, wherein the master data is uploaded automatically using an application programming interface (API); and display the simulation results to a graphical user interface (GUI) in form of graphs, plots, charts, and user-configurable analytic displays, wherein the simulation results are sent to a Material Replenisher Visualizer and presented to a user, provide, by the Material Replenisher Visualizer, a one-click option for the user to generate analysis by varying the parameters across multiple simulations, map optimization results in a plot style depending on objective values and number of objectives by the Material Replenisher Visualizer;

allow users to select to view trade-offs, rank objectives, assign weights to the objectives by the Material Replenisher Visualizer;

compute an order with each selection by the user; and re-draw a layout of points for the order in the GUI.

8. The system of claim 7, wherein the one or more hardware processors are configured to train a deep learning data model using the training data.

9. The system of claim 8, wherein the one or more hardware processors are configured to use the deep learning data model to generate one or more recommendations in response to a user query, by:

receiving the user query as input, wherein the user query is associated with values of one or more of the plurality of parameters;

selecting an algorithm matching the received user query, from among a plurality of algorithms;

processing the user query using the selected algorithm to simulate one or more replenishment scenarios associated with the user query; and generating the one or more recommendations in response to the user query, wherein the one or more recommendations indicate one or more replenishment options associated with each of the one or more replenishment scenarios.

10. The system of claim 9, wherein the one or more hardware processors are configured to associate the user query with values of one or more of the plurality of parameters of a) an existing replenishment option, or b) a new replenishment option to be simulated.

11. The system of claim 9, wherein each of the plurality of inventory policies encompasses a standard set of guidelines with respect to inventory transaction by at least one organization.

12. The system of claim 9, wherein the one or more recommendations may comprise comparison between the one or more replenishment options, emphasizing one or more differences between the one or more replenishment options.

13. One or more non-transitory machine-readable information storage mediums comprising one or more instructions which when executed by one or more hardware processors cause:

receiving an input data comprising a plurality of inventory policies;

verifying sufficiency of data for constructing a simulation network, via the one or more hardware processors, by processing the input data;

simulating a plurality of replenishment scenarios, via the one or more hardware processors, wherein each of the plurality of replenishment scenarios indicates a replenishment requirement associated with change in value of one or more of a plurality of parameters, wherein simulating each of the plurality of replenishment scenarios comprising:

determining at least one of a plurality of flow blocks associated with a plurality of scenarios supporting one or more contents of the input data, wherein the plurality of flow blocks are updated if none of the plurality of flow blocks is supporting the one or more contents of the input data; and generating one or more simulation results for the input data, based on a master data associated with a plurality of parts and products, one or more material one or more flow facilities, one or more facility roles, one or more business policies, and a safety stock information, wherein, the one or more simulation results for the input data forms a training data, wherein the master data is uploaded automatically using an application programming interface (API); and displaying the simulation results to a graphical user interface (GUI) in form of graphs, plots, charts, and user-configurable analytic displays, wherein the simulation results are sent to a Material Replenisher Visualizer and presented to a user;

providing, by the Material Replenisher Visualizer, a one-click option for the user to generate analysis by varying the parameters across multiple simulations;

mapping optimization results in a plot style depending on objective values and number of objectives by the Material Replenisher Visualizer;

allowing users to select to view trade-offs, rank objectives, assign weights to the objectives by the Material Replenisher Visualizer;

computing an order with each selection by the user; and re-drawing a layout of points for the order in the GUI.

14. The one or more non-transitory machine-readable information storage mediums of claim 13, wherein a deep learning data model is trained using the training data.

15. The one or more non-transitory machine-readable information storage mediums of claim 14, wherein the deep learning data model is used to generate one or more recommendations in response to a user query, comprising:

receiving the user query as input, wherein the user query is associated with values of one or more of the plurality of parameters;

selecting an algorithm matching the received user query, from among a plurality of algorithms;

processing the user query using the selected algorithm to simulate one or more replenishment scenarios associated with the user query; and generating the one or more recommendations in response to the user query, wherein the one or more recommendations indicate one or more replenishment options associated with each of the one or more replenishment scenarios.

16. The one or more non-transitory machine-readable information storage mediums of claim 15, wherein the user query is associated with values of one or more of the plurality of parameters of a) an existing replenishment option, or b) a new replenishment option to be simulated.

17. The one or more non-transitory machine-readable information storage mediums of claim 13, wherein each of the plurality of inventory policies encompasses a standard set of guidelines with respect to inventory transaction by at least one organization.

18. The one or more non-transitory machine-readable information storage mediums of claim 13, wherein the one or more recommendations may comprise comparison between the one or more replenishment options, emphasizing one or more differences between the one or more replenishment options.

* * * * *